June 27, 1967 — R. D. MALM — 3,327,391
DENTAL MATERIAL HOLDING APPARATUS
Filed July 20, 1964
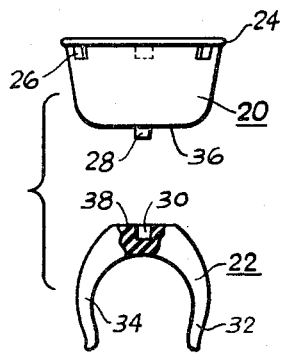
FIG_1
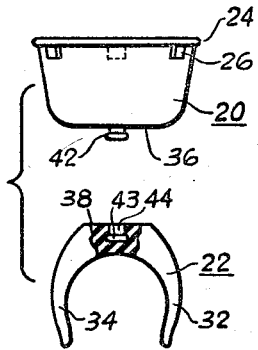
FIG_2
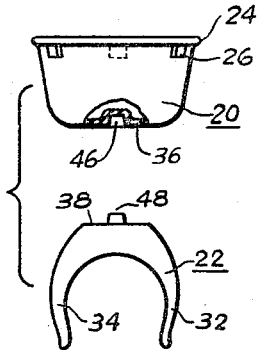
FIG_3
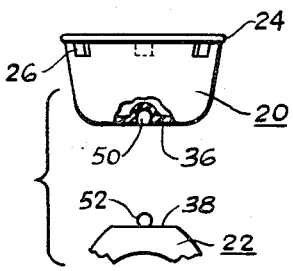
FIG_4
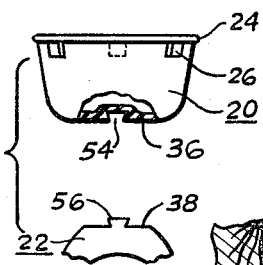
FIG_5
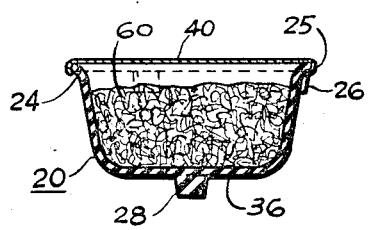
FIG_6
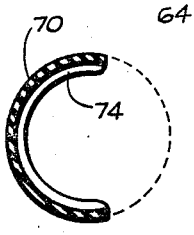
FIG_9
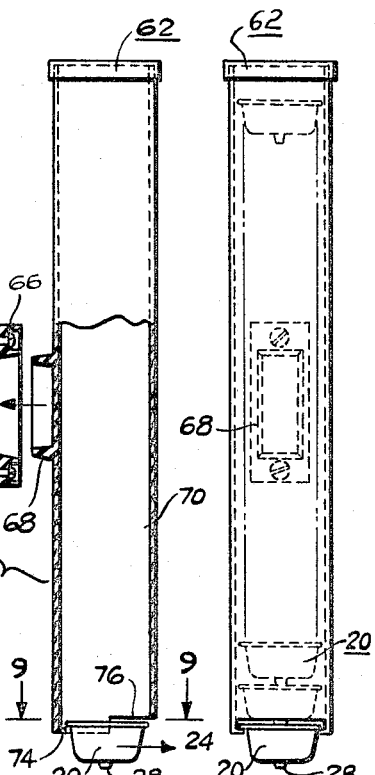
FIG_8  FIG_7
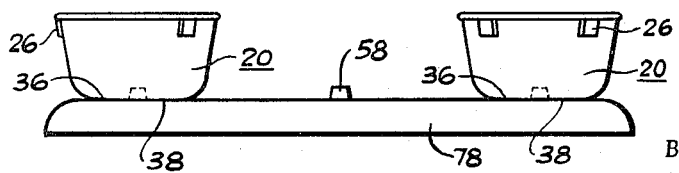
FIG_10
INVENTOR.
RICHARD D. MALM
BY
*Egbert T. Mueller*
ATTORNEY.

United States Patent Office 3,327,391
Patented June 27, 1967

3,327,391
DENTAL MATERIAL HOLDING APPARATUS
Richard D. Malm, 123 E. 2nd Ave.,
Escondido, Calif. 92025
Filed July 20, 1964, Ser. No. 383,714
8 Claims. (Cl. 32—1)

This invention relates to material holding apparatus and more particularly to an apparatus for dispensing sealed disposable cups containing usable material with the cups being slip-fitted or snap-connected to a supporting finger ring, pallet or the like.

It has been found advantageous to place a dental tray carrying the various well known dental materials as close and conveniently useful to the operator as possible. In some prior art devices the dental tray has been placed on the operator's finger. However, these prior art finger supported dental trays have the disadvantage of not being capable of easy continuous use. Rather they have to be cleaned and the dental material replaced after each use. Also these prior devices are expensive, heavy and often cumbersome and inflexible to use.

Therefore, it is an object of this invention to provide an improved material holding apparatus.

It is another object of this invention to provide an improved material holding apparatus for dispensing material in a throw-away cup.

It is another object of this invention to provide an improved finger-supported, disposable cup for holding dental materials.

Other important features of this invention are that the cups are inexpensive to make and are thus disposable. They are small in size, sealed, and can carry that amount of material to be immediately used in a given instance. The cups are readily storable in dispensers and have means for anchoring the cups securely and without tilting to a base, as on a finger ring support. Thus, in use the cups are quickly dispensed, snapped onto a base for use, and unsealed. Following use the cup and the remaining material in the cup are thrown away. While the invention has particular advantage in carrying dental materials, it also has other advantageous uses such as, for example, carrying artist's paints and the like.

These and other objects and features of the invention will become more apparent when read in light of the accompanying drawing in which:

FIGURE 1 is a side view partly in section of an embodiment of the invention showing the cup and the manner of attaching the cup to a finger ring;

FIGURE 2 is a side view partly in section of a modified embodiment of the invention;

FIGURE 3 is a side view partly in section of another modified embodiment of the invention;

FIGURE 4 is a side view partly in section of still another modified embodiment of the invention;

FIGURE 5 is a side view partly in section of another modified embodiment of the invention;

FIGURE 6 is a cross-sectional view of the cup;

FIGURE 7 is a view of the dispenser with representative cups shown in phantom;

FIGURE 8 is a view partly in section of the dispenser and a wall mounting installation;

FIGURE 9 is a view taken along lines of 9—9 of FIGURE 8;

FIGURE 10 is a side view of a pallet type base for supporting the cups.

Referring now to FIGURES 1 through 6, a cup means 20 is shown having a circular configuration. However, it should be recognized that within the invention the cup means could have other shapes. The cup means 20 can be constructed of any suitable inexpensive material, such as light-gauge clear acetate. The cup means is intended to be a throw-away so any inexpensive suitable material may be used to make the cup 20.

The function of the cup means or cup 20 is to carry materials. When used as a dental tray the materials would be dental medicants, pumices and the like. The size of the cup would generally be limited to that size required to carry the material to be immediately used. The container would normally be sealed by a cover or lid 40. Cover 40 could be made from metals, such as aluminum, or from cellophane that may be heat sealed to the outwardly projecting rim 24 of the cup 20. The lid could also be made from plastic and have an inwardly curled outer circumference 25 that snaps over the rim 24 and covers the opening.

After the cup 20 is unsealed for use, then it is not normally resealed but rather is thrown away. The material left in the cup is also normally disposed of with the cup. Thus the amount of material in the cup is determined by that expected to be immediately used. When the cup is used as a dental tray, second use of the dental material is often not desirable. Thus it is advantageous to be able to dispose of the material and the cup means container simultaneously, thereby eliminating having to wash the container and reinsert other dental material. Of course, where the cup is used to carry artist's paints then it can be resealed by recovering with the snap lid.

The finger ring support 22 is used to support the cup means where the contents are to be used by operators, such as dentists. The ring is split with elements 32 and 34 being sufficiently flexible to grip human fingers and other likely supports of varying sizes. The split finger ring 22 of FIGURE 1 can be made of more permanent material since the ring is not considered to be disposable with the cups 20. The ring has a recess 30 with dimensions corresponding to that of projections 28 on the cup 20. Accordingly when interconnected a friction fit results that securely holds that flat portion 36 of the cup 20 against the flat portion 38 of the split finger ring 22 making a nontilting secured connection.

The projection 42, see FIGURE 2, has an enlarged portion that snap fits into the similarly shaped recess 43 in ring 22. In the modified form of FIGURE 3, the recess 46 is in the cup and the projection 48 is on the ring. In FIGURE 4 a ball 52 and socket 50 snap fit together. In FIGURE 5 a mating wedge 56 and recess 54 are shown. They may be snap fitted together or inserted from the side.

A dispenser unit 62, see FIGURES 7 and 8, receives the filled and sealed cups 20 and stacks them vertically for later dispensing at the point and time of use. The cups are held by cylindrical walls 70 with the lowest cup being supported by the rim 24 resting on shoulder 74. The lowest cup in turn supports the remainder of the cups. The cups are removed from the dispenser by sliding in a radial direction from said container through opening 76.

The dispenser can be freely moved and when desired quickly secured to a wall 64 or other base member by interaction of the male-female friction coupling 66 and 68.

The longitudinal support member 78 can support several cups 20 in the manner shown. The support member can be an artist's pallet or can be an elongated surface mounted on the finger rings.

In use the material 60 is placed in several cup means 20 and the cup means 20 are sealed and inserted into dispensers 62. The dispensers 62 are shipped to the point of use of the material. The cup means 20 are then individually removed as desired, the seal 40 removed and the cup means 20 are then placed on the finger ring 22 which finger ring may be on the finger of the user. When the material has been used the cup means 20, lid seal 40 and residue material are thrown away.

It should be recognized that the cup means may, if so desired, be constructed of more permanent type material and reused. For this purpose spacing elements 26 function to support cups 20 when stacked one within the other.

Various modifications are contemplated and may obviously be resorted to by those skilled in the art without departing from the spirit and scope of the invention as hereinafter defined by the claims.

I claim:
1. A dental material holder comprising:
a finger ring,
cup means for supporting said material,
said cup means and said finger ring means having securing means for removably securing said cup means to said finger ring,
and said securing means comprising a projection and allowing said cup means to be selectively and easily attached to said finger ring means and a close fitting recess for receiving said projection.

2. The combination recited in claim 1 wherein said cup means and said finger ring means have adjacent flat surfaces that abut when said cup means and said ring means are secured together.

3. A dental material holder consisting of:
a finger ring,
cup means for supporting said material,
said cup means and said finger ring means having securing means for releasably securing said cup means to said finger ring means,
said securing means comprising a projection and a close fitting projection receiving recess,
and said projection and recess having a sufficiently resilient construction that said projection is capable of being removably snap-fitted into said recess.

4. The combination recited in claim 3 wherein said projection is a ball and said recess is a socket.

5. The combination recited in claim 3 wherein said projection is an inverted wedge and said recess is a wedge shaped socket.

6. The combination recited in claim 3 wherein the end of said projection and the bottom of said recess have a corresponding width greater than the remainder of said projection and the opening of said recess.

7. The combination recited in claim 3 wherein said cup means and said finger ring means have abutting flat surfaces.

8. A dental material holder comprising:
a finger ring,
cup means for supporting said material,
said cup means and said finger ring having securing means for releasably securing said cup means to said finger ring,
said securing means consisting of a projection and a close fitting recess for receiving said projection,
said cup means having an opening with a radically outwardly projecting rim,
and resilient sealing cover means for being removably snap-fitted over said rim and sealing said material in said cup means.

References Cited

UNITED STATES PATENTS

| | | |
|---|---|---|
| 902,109 | 10/1908 | Powell. |
| 2,320,070 | 5/1943 | Derham et al. _____ 215—100 |
| 2,665,479 | 1/1954 | Weldon _____ 32—1 |
| 2,767,711 | 10/1956 | Ernst _____ 220—60 |
| 3,037,616 | 6/1962 | Phipps _____ 220—60 |
| 3,079,037 | 2/1963 | Schechter _____ 220—60 |
| 3,107,028 | 10/1963 | De Robertis _____ 220—60 |
| 3,121,511 | 2/1964 | Whitehead _____ 221—283 |

FOREIGN PATENTS 121,869   8/1927   Switzerland.

THERON E. CONDON, *Primary Examiner.*

W. T. DIXSON, *Assistant Examiner.*